United States Patent [19]

Relyea

[11] Patent Number: 4,621,372
[45] Date of Patent: Nov. 4, 1986

[54] DUAL COMMUNICATION HEADSET
[75] Inventor: Robert G. Relyea, Carrollton, Tex.
[73] Assignee: RGR Services, Inc., Carrollton, Tex.
[21] Appl. No.: 674,419
[22] Filed: Nov. 23, 1984
[51] Int. Cl.$^4$ ............................................. H04B 1/38
[52] U.S. Cl. ...................................... 455/74; 455/88; 455/89; 370/32
[58] Field of Search ........................ 455/73, 74, 79, 88, 455/89; 370/32

[56] References Cited

U.S. PATENT DOCUMENTS

| | | |
|---|---|---|
| 2,094,002 | 9/1937 | Florez . |
| 2,694,140 | 11/1954 | Gilman et al. . |
| 3,504,120 | 3/1970 | Levitt . |
| 3,512,088 | 5/1970 | Ross . |
| 3,588,701 | 9/1968 | Kahn ..................................... 455/73 |
| 3,745,467 | 7/1973 | Lundquist et al. . |
| 3,885,216 | 7/1975 | Kahn . |
| 4,077,007 | 2/1978 | McKinney . |
| 4,088,849 | 5/1978 | Usami et al. . |
| 4,155,040 | 5/1979 | Harmon et al. . |
| 4,245,136 | 1/1981 | Krauel, Jr. . |
| 4,524,461 | 6/1985 | Kostanty et al. ..................... 455/89 |

Primary Examiner—Jin F. Ng
Assistant Examiner—Elissa Seidenglanz
Attorney, Agent, or Firm—Sigalos & Levine

[57] ABSTRACT

A headset for communication with both FM and AM circuit signals comprising a first earphone for receiving only FM signals and a second earphone for receiving only AM signals and first and second switches associated with the headset and coupled to the FM and AM circuits for selectively transmitting a response to either of the received signals on a corresponding one of the FM and AM circuits.

9 Claims, 2 Drawing Figures

DUAL COMMUNICATION HEADSET

BACKGROUND OF THE INVENTION

The present invention relates in general to a headset for receiving both FM and AM communication signals and in particular to a headset which receives FM signals in one earphone and AM signals in the other earphone with a microphone and first and second switches for enabling the user to selectively transmit a response on either the FM channel or the AM channel.

It is well known in certain occupational fields that individuals such as, for example, police officers or control tower operators or firemen or snow removal equipment operators must communicate with two different systems operating on AM and FM frequencies respectively. For example, airport firemen or snow removal equipment operators may communicate with the control tower on an AM frequency while at the same time maintaining communications with airport operations on an FM frequency. With the presently existing systems, the FM and AM signals may terminate at speakers mounted in a vehicle having high noise levels such as a snow plow or fire engine and when the signals are received, it is often difficult to tell which circuit was operative, the FM or the AM circuit. This difficulty arises normally because of the noise level of the environment in which the communication system is used.

The present invention overcomes the disadvantages of the prior art by providing a headset which receives only the FM signals in one ear and only the AM signals in the other ear. Thus, there is no doubt as to when a message has been received on either the AM or FM circuits. To transmit a response or reply to the sender of the received signal, the user simply presses a switch representing FM if the response is to an FM signal and speaks into the microphone and the reply is transmitted on the FM circuit. If the signal received were an AM signal, then the user simply depresses an AM switch and speaks and the reply is transmitted on the AM circuit.

In the preferred embodiments, an FM transmit switch is placed on the FM earphone and an AM transmit switch is placed on the AM earphone so that when the operator desires to answer the message received in a particular earphone, he simply depresses the switch actually physically positioned on that earphone and speaks and the reply is transmitted to that particular circuit whether it is AM or FM.

Thus, it is an object of the present invention to provide a new and improved communications headset which receives only the AM signals in one earphone and only the FM signals in the other earphone and which has a common microphone whose output is coupled to either the AM or FM circuit by depressing the proper switch.

It is also an object of the present invention to avoid the confusion that is caused by noise levels associated with the prior art devices by coupling the FM signals to one earphone only and the AM signals to the other earphone only and physically mounting a transmission switch on each earphone so that in order to respond to a message received in one particular earphone the user simply depresses or actuates the switch physically positioned on that earphone and speaks into the microphone.

SUMMARY OF THE INVENTION

Thus, the present invention relates to a new and improved headset for communication with both FM and AM circuit signals comprising a first earphone for receiving an FM signal and a second earphone for receiving only AM signals and means associated with the headset and coupled to said FM and AM circuits for selectively transmitting a response to either of the received signals on a corresponding one of the FM and AM circuits. It is also an object of the present invention to provide a method of communicating with both AM and FM signal circuits comprising the steps of receiving AM signals in one earphone of a headset and FM signals in the other earphone of a headset and selectively transmitting on either said AM or FM signal circuits from a microphone associated with said headset.

BRIEF DESCRIPTION OF THE DRAWINGS

These and other objects of the present invention will be seen more clearly in conjunction with the attached description and the drawings in which.

DETAILED DESCRIPTION OF THE DRAWINGS

Figure 1:
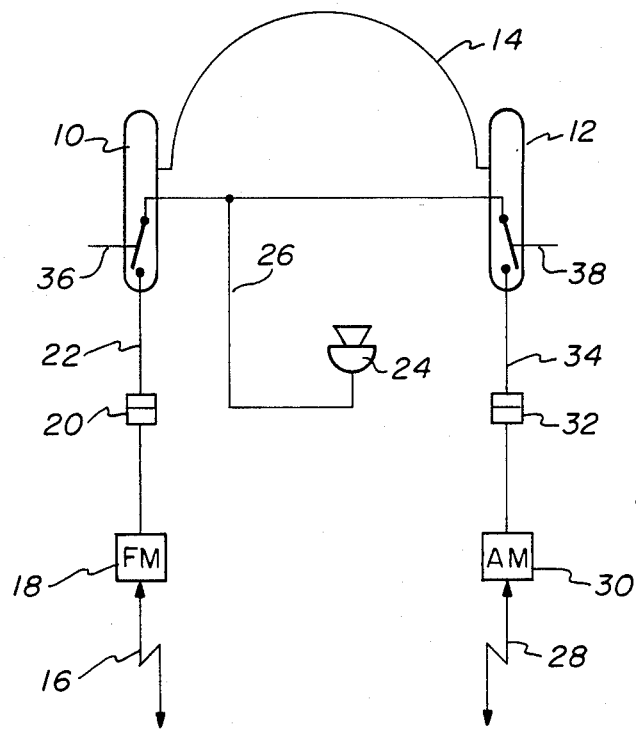
FIG. 1 is a diagrammatic representation of the preferred embodiment of the present invention wherein the transmission switches are physically positioned on the earphones.

FIG. 1 is a diagrammatic representation of the preferred embodiment of the present invention in which a pair of earphones 10 and 12 are coupled by a band 14 and held in some fixed relationship with respect to each other. The FM signals 16 are received from a remote source (not shown) by an FM receiver 18. The output of the FM receiver is coupled through a plug-in connector 20 to earphone 10. For sake of convenience and ease of illustration, only one line 22 is shown between earphone 10 and FM receiver/transmitter 18. However, one or more lines could be used to carry the signals received by the FM receiver transmitter 18 to earphone 10 and a separate line could be used from microphone 24 on line 26 through earphone 10 and back to FM receiver transmitter 18 for transmission to the remote FM source.

In like manner the AM signal 28 received by AM receiver transmitter 30 is coupled through plug-in connector 32 on line 34 to earphone 12. Again, only one line 34 is shown between earphone 12 and AM receiver/transmitter 30 for ease of illustration but obviously more than one line could be used to carry both the received signal information and that signal information which is to be transmitted.

FIG. 1 is the preferred embodiment of the present invention. The FM signals, as stated, are received in earphone 10 while the AM signals are received in earphone 12. If a signal is received on both earphones simultaneously and the user desires to communicate with the individuals transmitting the FM signal, he simply actuates switch 36 (for example, by depressing it) which is physically mounted on the outside of earphone 10 and when activated switch 36 closes thus coupling the signals from microphone 24 out to FM receiver/transmitter 18 for transmission back to the remote source. In like manner, if he wishes to communicate with those transmitting the AM signals, he simply depresses switch 38 which is physically mounted on the other earphone 12 in FIG. 1 which couples output signals from microphone 24 directly out through the earphone 12, line 34, plug-in connector 32 to AM transmitter receiver 30 for transmission to the AM source. Thus, the user can select either source of information for purposes of communication simply by actuating the switch on that earphone receiving the signal to which he desires to respond. Thus, a response to either of the received signals may be selectively transmitted on a corresponding one of the FM or AM circuits.

Figure 2:
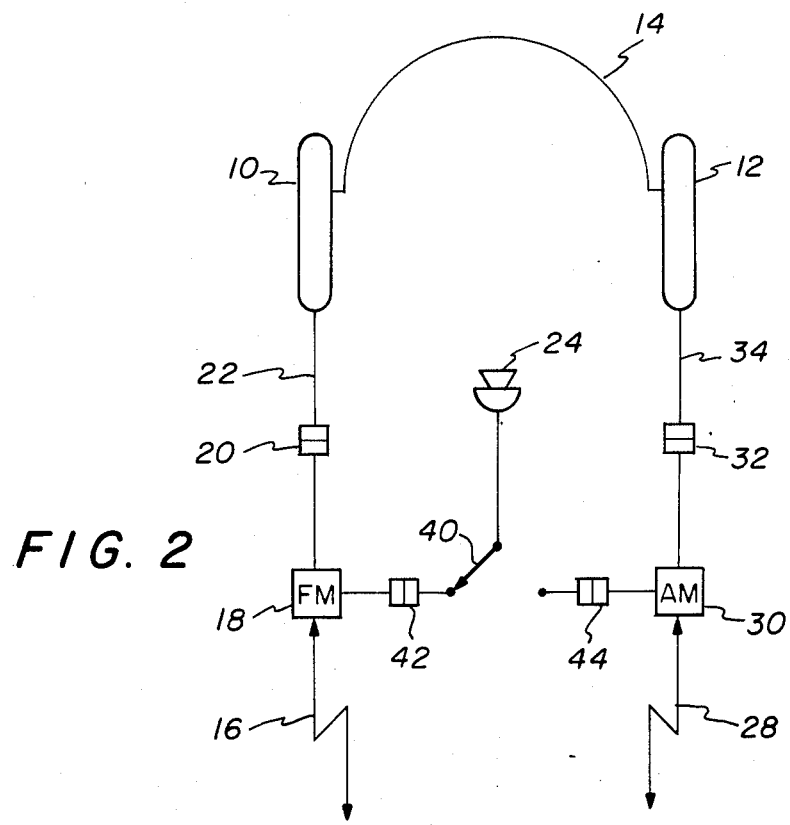
FIG. 2 is an alternate embodiment of the present invention in which the transmission switch is a single pole double throw switch which is associated with the microphone.

An alternate embodiment of the device is shown in FIG. 2 wherein the microphone 24 is coupled through a switch 40 which is a single-pole, double-throw switch connecting the microphone 24 either to the FM receiver/transmitter 18 or to the AM receiver/transmitter 30. It has been found to be more advantageous to place the switches immediately on the earphones 10 and 12 as shown in FIG. 1; however, the alternate device as shown in FIG. 2 would allow a single-pole, double-throw switch to be placed in some other location than immediately on the earphones. The received FM signals would still be coupled to earphone 10 through plug-in connector 20 and line 22 while the received AM signals would be coupled to earphone 12 through plug-in connector 32 and line 34. Microphone 24 and switch 40 may also be removably connected to the FM and AM receiver/transmitter 18 and 30 through respective plug-in connectors 42 and 44.

Thus, there has been described a novel communications headset for use with both FM and AM signal communication circuits comprising first and second earphone receivers with one of the receivers receiving only FM signals and the other receiver receiving only AM signals and having a microphone associated with the headset and a switch coupled to the microphone for selectively transmitting a response to either of the received signals on the appropriate FM or AM circuit.

While the invention has been disclosed in connection with a preferred embodiment, it is to be understood that the scope of the invention is not intended to be limited to the particular form set forth, but, on the contrary, it is intended to cover such alternatives, modifications and equivalents as may be included within the spirit and scope of the invention as defined by the appended claims.

I claim:

1. In a communication system having a first transceiver for selectively receiving or transmitting AM communication signals and a second transceiver for selectively receiving or transmitting FM communication signals, the improvement comprising:
   a. a headset having first and second earphones,
   b. means for connecting said first earphone only to said AM receiver and said second earphone only to said FM receiver whereby only AM communications are received in said first earphone and only FM communications are received in said second earphone,
   c. a microphone associated with said headset for generating electrical signals, and
   d. means for selectively coupling said microphone to one of said transceivers for transmitting said electrical signals thereon without disrupting communication signals being received from the other transceiver in said earphone connected thereto whereby communication may be transmitted on either of said transceivers simultaneously with communications being received from said other transceiver.

2. The improvement as in claim 1 wherein said selective coupling means comprises:
   a. a first switch coupled to said microphone for transmitting said microphone signals only on said FM circuit while simultaneously receiving said AM signals on said first earphone, and
   b. a second switch coupled to said microphone for transmitting said microphone signals only on said AM circuit while simultaneously receiving said FM signals on said second earphone.

3. The improvement as in claim 2 wherein:
   a. said first switch is mounted on said first earphone receiver, and
   b. said second switch is mounted on said second earphone receiver.

4. A headset for communication with both FM and AM signal circuits comprising:
   a. first earphone coupled to said FM circuit for receiving only FM signals and a second earphone coupled to said AM circuit for receiving only AM signals, and
   b. means associated with said headset and coupled to said FM and AM circuits for selectively transmitting a signal on a respective one of said AM and FM circuits while simultaneously receiving signals from the other circuit on a corresponding one of said earphones.

5. A headset as in claim 4 wherein said selective transmitting means comprises:
   a. a microphone associated with said headset,
   b. a first switch coupled to said microphone for transmitting said response only on said FM circuit while simultaneously receiving said AM signals in said second earphone, and
   c. a second switch coupled to said microphone for transmitting said response only on said AM circuit while simultaneously receiving said FM signals in said first earphone.

6. A headset as in claim 5 wherein:
   a. said first switch is mounted on said first earphone receiver for causing FM signal transmission simultaneously with reception of said AM signals by said second earphone, and
   b. said second switch is mounted on said second earphone receiver for causing AM signal transmission simultaneously with reception of said FM signals by said first earphone.

7. A method of communicating with both AM and FM signal circuits comprising the steps of:
   a. receiving AM signals from said AM signal circuit only in one earphone of a headset and FM signals from said FM circuit only in the other earphone of a headset, and
   b. selectively transmitting a communication signal to a selected one of said AM or FM circuits from a microphone associated with said headset while simultaneously receiving signals from the other of said AM or FM circuits by its associated earphone.

8. A method as in claim 7 further including the step of selectively switching said microphone to either said AM signal circuit or said FM signal circuit for transmitting said signal while simultaneously receiving a signal in the earphone coupled to the other of said AM or FM signal circuits.

9. A method as in claim 8 further including the steps of:
   a. mounting a first switch on said one earphone,
   b. mounting a second switch on said other earphone,
   c. actuating said first switch to couple said microphone transmission to said AM signal circuit while simultaneously receiving said FM signal only in said FM earphone, and
   d. actuating said second switch to couple said microphone transmission to said FM signal circuit while simultaneously receiving said AM signal only in said AM earphone.

* * * * *